United States Patent [19]

Roelants

[11] 4,148,584

[45] Apr. 10, 1979

[54] LASER TELEMETER

[75] Inventor: Jacques Roelants, Antony, France

[73] Assignee: Compagnie Industrielle des Lasers, Marcoussis, France

[21] Appl. No.: 854,969

[22] Filed: Nov. 25, 1977

[30] Foreign Application Priority Data

Nov. 30, 1976 [FR] France ................ 76 36040

[51] Int. Cl.² .................. G01C 3/08; G02B 27/00
[52] U.S. Cl. ..................... 356/5; 350/276 SL
[58] Field of Search ........... 356/28, 5; 350/276 R, 350/276 SL

[56] References Cited

U.S. PATENT DOCUMENTS

| | | | |
|---|---|---|---|
| 3,652,161 | 3/1972 | Ross | 356/5 |
| 4,005,935 | 2/1977 | Wang | 356/5 |
| 4,042,822 | 8/1977 | Brandewie et al. | 356/5 |

FOREIGN PATENT DOCUMENTS 2340687  2/1975  Fed. Rep. of Germany ...... 250/276 R

Primary Examiner—S. C. Buczinski
Attorney, Agent, or Firm—Sughrue, Rothwell, Mion, Zinn and Macpeak

[57] ABSTRACT

The invention relates to a laser telemeter, which includes a cell (8) containing a saturable absorbent material disposed between the laser generator (1) and the optical emission system (9, 10), to prevent false readings due to back scattering of the non-coherent fluorescent radiation emitted in conjunction with a laser pulse. The telemeter can be used to equip tanks and aircraft.

3 Claims, 1 Drawing Figure

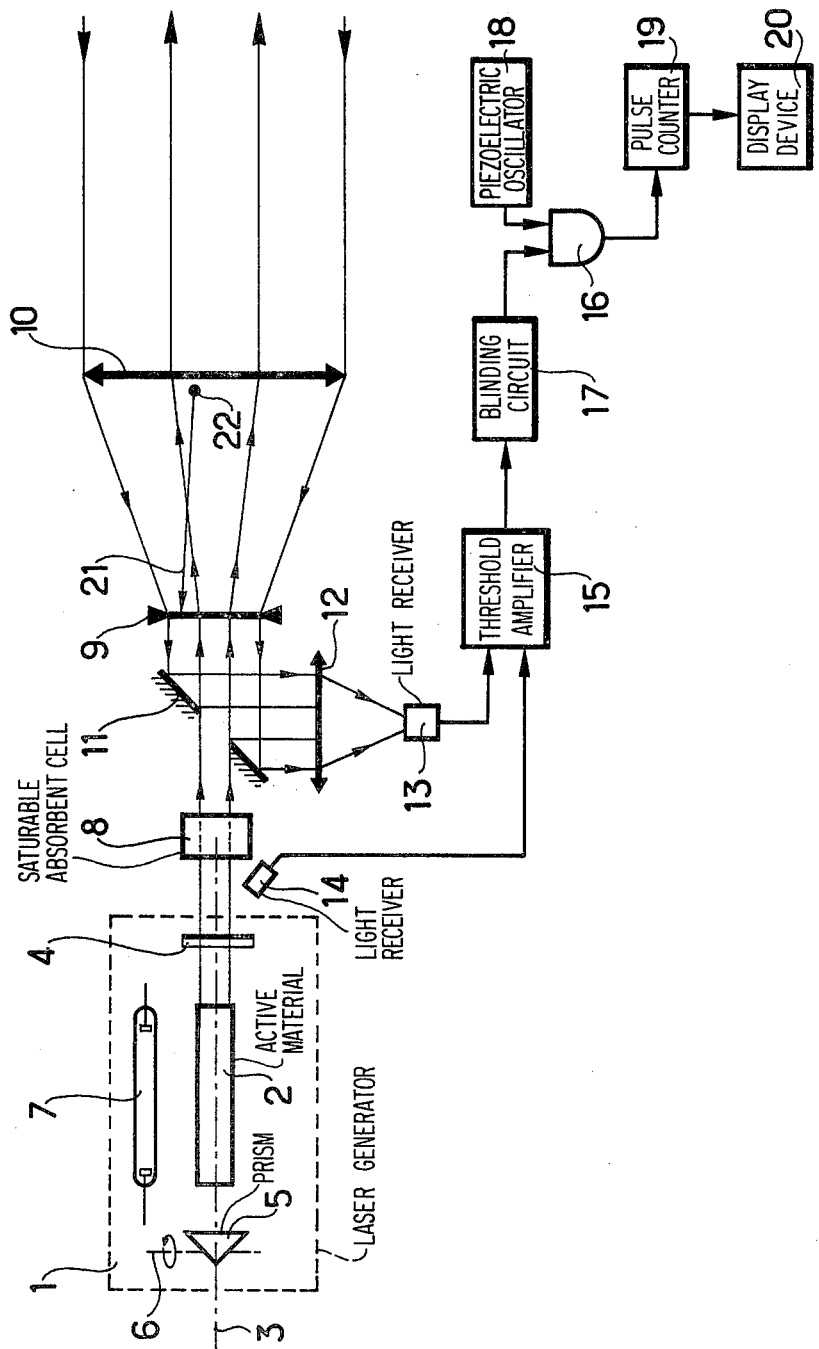

LASER TELEMETER

FIELD OF THE INVENTION

The present invention relates to laser telemeters and in particular to laser telemeters in which the distance of a target is obtained by measuring the interval of time which elapses between the departure of a laser pulse and the reception of its "echo" by the telemeter.

BACKGROUND OF THE INVENTION

In telemeters of this type, the active laser material is illuminated by the flash of a discharge lamp, which causes fluorescent radiation to propagate along the same path as the laser pulse, the duration of this radiation being much longer than that of the laser pulse. Since such telemeters generally comprise optical emission and reception systems which are situated close to each other, the optical reception means can receive an interfering flash of the fluorescent radiation due to scattering of the fluorescent flash coming from the emission optical means. Although the power of the fluorescent radiation is much less than that of the laser pulse, this flash, by following a short optical path can reach the receiver of the telemeter at a power similar to that of a laser echo returned by a target and consequently it can cause a false measurement of its distance.

Preferred embodiments of the present invention mitigate this disadvantage.

SUMMARY OF THE INVENTION

The present invention provides a laser telemeter comprising: a laser generator. The laser generator comprises an active material disposed inside an optical resonant cavity;

means for exciting the active material, said means being capable of generating fluorescent light radiation along the axis of said cavity; and means for triggering in said excited material the emission of a laser pulse.

An optical emission system is disposed at the output of said laser generator to direct said laser pulse to a target.

An optical reception system for receiving an echo of said laser pulse returned by said target is disposed near said optical emission system so that it can receive interference light coming from the optical emission system, this optical reception system being suitable for concentrating the light energy which it receives.

A reception circuit includes a chronometer and is connected to said laser generator so as to transmit an electric emission signal to the chronometer when the laser generator emits said laser pulse. This circuit is further connected to said optical reception system so as to transmit an electric reception signal to the chronometer when this circuit receives said concentrated light energy. The chronometer is suitable for measuring the time which elapses between the instants when it receives respectively the electric emission signal and the electric reception signal.

A cell containing a saturable absorbent material is disposed between said laser generator and said optical emission system. This material is capable of absorbing said light when the power of the light is less than a saturation level and of allowing the light to pass when its power is greater than the saturation level. The saturation level is greater than the power of said fluorescent light pulse and less than the power of said laser pulse.

BRIEF DESCRIPTION OF THE DRAWING

An embodiment of the invention is described hereinbelow by way of non-limiting illustration, with reference to the accompanying drawing, in which the single FIGURE shows schematically an embodiment of the laser telemeter in accordance with the invention.

DESCRIPTION OF THE PREFERRED EMBODIMENT

This figure shows a laser generator 1 comprising essentially an active material 2 such as a bar of glass doped with neodymium disposed inside an optical resonant cavity having an axis 3. This cavity is formed by a semi-transparent mirror 4 and a totally reflecting prism 5 which can be made to rotate about an axis 6. A discharge tube 7 connected to an electric generator (not shown) makes it possible to excite the active material 2.

A cell 8 containing a saturable absorbent material is disposed on the axis 3 at the output of the laser generator 1. This cell may be a glass receptacle containing a liquid solution of the material. It may also be a matrix made of a plastics material in which a thin film of said material is inserted. When the laser generator 1 is a laser generator with neodymium doped glass, its emission wavelength is 1.06 microns, and this material can be for example:

Di (4-diethylamino dithiobenzyl) nickel.

The light beam leaving the material 8 passes through an optical emission system which directs it towards a target, not shown. This optical system is for example an afocal system constituted by a diverging lens 9 and a converging lens 10.

An optical reception system is disposed near the optical emission system to receive an echo of the light beam returned by the target. In the example illustrated in the figure, this optical reception system includes a part which is common with the optical emission system. It comprises, indeed, firstly the lenses 9 and 10 and secondly a mirror 11 and a concentration lens 12. The mirror 11 is disposed between the cell 8 and the lens 9. It is provided with a central orifice to allow the laser emission to pass and is inclined at 45° to the axis 3 to send the reception beam to the lens 12.

The telemeter shown in the figure also includes a reception circuit. This circuit comprises a light receiver 13 disposed to receive the light energy concentrated by the lens 12 and suitable for transforming this energy into an electric signal and a receiver 14 analagous to the receiver 13 and disposed near the beam leaving the laser generator 1. The electric outputs of the receivers 13 and 14 are connected to a threshold amplifier 15 whose output is connected to the control of a gate 16 for example through a blinding circuit 17. A piezoelectric oscillator 18 is connected to the input of the gate 16 whose output is connected to a pulse counter 19 which is itself connected to a display device 20.

The operation of this telemeter is as follows:

Excited by a flash of light from the discharge lamp 7, the active material 2 emits fluorescent radiation whose duration can be in the order of 300 microseconds. The prism 5 makes it possible to trigger, in the excited material 2, a laser pulse whose duration is much shorter, for example 30 nanoseconds. The fluorescent radiation is an emission of non-coherent light whose wavelength is not very different from that of the laser pulse on which it is centred.

The fluorescent radiation and the laser pulse leave the cavity through the semi-transparent mirror 4 and pass through the cell 8.

The saturable absorbent material contained in the cell 8 is capable of absorbing light whose wavelength corresponds substantially to that of the laser pulse, this absorption taking place only if the power of the light is less than a saturation threshold which is a characteristic of the material. If the power of the light passing through the cell 8 exceeds the saturation threshold, the material is saturated and allows the light to pass through without appreciable absorption. Now, the saturation threshold of the saturable absorbent material is situated well above the power of the fluorescent radiation, which is in the order of one milliwatt and below the power of the laser pulse, in the order of one megawatt. Consequently, the saturable absorbent material absorbs the fluorescent radiation and allows the laser pulse to pass.

The laser pulse leaving the cell 8 passes through the afocal optical system 9, 10, along an axial part of this system. This afocal system makes it possible to reduce the divergence of the emission beam. The echo of the laser pulse returned by the target reaches the peripheral part of the afocal system 9, 10, outside the zone reserved for emission, and is then reflected by the mirror 11 towards the concentration lens 12.

The receiver 14 makes it possible to collect a small part of the power of the laser pulse emitted by the generator 1 and to emit, in response thereto, an electric emission signal which, provided it is greater than the threshold of the amplifier 15, is amplified by the amplifier, so as to open the gate 16 and allow the electric pulses emitted by the oscillator 18 to enter the counter 19. The reception light energy concentrated by the lens 12 is transformed by the receiver 13 into an electric reception signal which also passes through the threshold amplifier 15 to close the gate 16.

The blinding circuit 17, which can comprise a flip-flop for example, makes it possible to block the electric reception signals which could be emitted in a predetermined interval of time after the emission of the later pulse, so as to prevent such signals from closing the gate 16.

The predetermined interval of blind time can be 3 microseconds for example. It corresponds to the minimum range of the telemeter (450 meters in this case) also called the blind distance.

The time which elapses between the electric emission signal and the electric reception signal is therefore measured by the chronometer constituted by the oscillator 18 and the counter 19. It is known that this time is proportional to the distance of the telemeter from the target. This distance is then displayed, for example in digital form, by the display device 20.

In the telemeter described hereinabove, the fluorescent radiation cannot pass through the emission optical system since it is absorbed by the saturable absorbent material contained in the cell 8.

It is known that in prior art telemeters which do not include saturable absorbent material, the fluorescent radiation passes through the emission optical system. The duration of this radiation can extend beyond the instant of emission of laser pulse, and throughout the whole time interval in which the reception of an echo is possible, this time interval being 100 microseconds if the maximum range of the telemeter is 15 kilometers. In these conditions, a part of the fluorescent radiation passing through the emission optical system can be back scattered to the reception zone of the afocal system 9, 10 by a grain of dust 22 situated in the emission zone of the afocal system 9-10. The energy back scattered in the direction of the arrow 21 is then directed by the optical reception system towards the receiver 13. The electric signal which results therefrom can be at a power greater than the reception threshold of the amplifier 15 and can consequently inadvertently close the gate 16 causing an erroneous distance measurement.

The telemeter illustrated by the figure makes it possible by absorbing the fluorescent radiation to eliminate this back scattering interference.

It should be observed, however, that saturable absorbent materials remain conductive during a short interval of time after passing a light pulse of greater power than the absorption threshold and recover absorption capacity again only after a recovery time which is a characteristic of the material chosen. In the telemeter shown in the figure, the saturable absorbent material is preferably chosen in such a way that its recovery time is less than the blind time of the telemeter to prevent the gate 16 from being closed by an interference reflection occurring during the the recovery time, and outside the blind time.

In the case where the laser wavelength is 1.06 microns and where the saturable absorbent material is chosen according to the example mentioned above, the recovery time is less than one microsecond, this being less than the blind time of 3 microseconds mentioned above.

The laser telemeter in accordance with the present invention can be applied in particular to the equipping of tanks and of aircraft.

Naturally, the invention also applies to any active laser material other than glass and to any emission wavelength other than 1.06 microns, it then being possible for the nature of the saturable absorbent material inserted in the cell 8 to be different from that given in the example; likewise the invention applies to whatever type of triggering is used for laser cavity.

What is claimed is:

1. A laser telemeter comprising:
   a laser generator comprising an active material disposed inside an optical resonant cavity, means for exciting the active material, said exciting means being capable of generating fluorescent light radiation along the axis of said cavity, and means for triggering in said excited material the emission of a laser pulse;
   an optical emission system disposed at the output of said laser generator to direct said laser pulse to a target;
   an optical reception system for receiving an echo of said laser pulse returned by said target, said optical reception system being disposed near said optical emission system to receive interference light coming from the optical emission system and comprising means for concentrating the light energy which it receives;
   a reception circuit including a chronometer, said circuit being connected to said laser generator so as to transmit an electric emission signal to said chronometer when the laser generator emits said laser pulse, said circuit being further connected to said optical reception system to transmit an electric reception signal to said chronometer when said circuit receives said concentrated light energy, said chronometer being capable of measuring the time which elapses between the instants when it receives respectively the electric emission signal and the electric reception signal; and a cell containing a saturable absorbent material disposed between said laser generator and said optical emission system, said material being capable of absorbing said light when the power of the light is less than a saturation level and of allowing the light to pass when its power is greater than the saturation level, and the saturation level being greater than the power of said fluorescent radiation and less than the power of said laser pulse.

2. A telemeter according to claim 1, wherein said reception circuit comprises a blinding circuit for preventing an electric reception signal from being received by said chronometer during a predetermined interval of time after the emission of said laser pulse, said predetermined interval of time corresponding to the minimum range of the telemeter and wherein said saturable absorbent material having a recovery time of less than said predetermined interval of time, said recovery time being the time at the end of which said saturable absorbent recovers its absorption capacity after passing a pulse of said light whose power is greater than said saturation level.

3. A telemeter according to claim 1, wherein the emission optical system also forms part of the reception optical system.

* * * * *